United States Patent [19]
Kou

[11] Patent Number: 5,978,923
[45] Date of Patent: Nov. 2, 1999

[54] METHOD AND APPARATUS FOR A COMPUTER POWER MANAGEMENT FUNCTION INCLUDING SELECTIVE SLEEP STATES

[75] Inventor: James Kou, Corona, Calif.

[73] Assignee: Toshiba America Information Systems, Inc., Irvine, Calif.

[21] Appl. No.: 08/908,545

[22] Filed: Aug. 7, 1997

[51] Int. Cl.[6] .................................... G06F 17/20

[52] U.S. Cl. .................... 713/323; 713/324; 713/320; 713/330

[58] Field of Search .................... 395/750.01, 750.02, 395/750.03, 750.05–750.08, 281–283, 882–884, 892, 893

[56] References Cited

U.S. PATENT DOCUMENTS

| | | | |
|---|---|---|---|
| Re. 36,189 | 4/1999 | Carter et al. ........................... | 713/324 |
| 4,747,041 | 5/1988 | Engel et al. ........................ | 395/750.01 |
| 5,283,819 | 2/1994 | Glick et al. ............................ | 379/90 |
| 5,313,642 | 5/1994 | Seigel ................................ | 395/750.01 |
| 5,339,445 | 8/1994 | Gasztonyi . | |
| 5,355,490 | 10/1994 | Kou ........................................ | 395/700 |
| 5,396,635 | 3/1995 | Fung . | |
| 5,408,668 | 4/1995 | Tornai ................................ | 395/750.01 |
| 5,410,711 | 4/1995 | Stewart . | |
| 5,465,366 | 11/1995 | Heineman .......................... | 395/750.01 |
| 5,511,203 | 4/1996 | Wisor et al. . | |
| 5,513,359 | 4/1996 | Clark et al. . | |
| 5,521,854 | 5/1996 | Kadowaki et al. . | |
| 5,530,878 | 6/1996 | Bauer et al. ........................ | 395/750.01 |
| 5,546,591 | 8/1996 | Wurzburg et al. . | |
| 5,560,024 | 9/1996 | Harper et al. . | |
| 5,638,541 | 6/1997 | Sadashivaiah ..................... | 395/750.04 |
| 5,721,934 | 2/1998 | Scheurich .......................... | 395/750.01 |
| 5,884,088 | 3/1999 | Kardach et al. ....................... | 713/324 |
| 5,887,179 | 3/1999 | Halahmi et al. ...................... | 713/324 |

OTHER PUBLICATIONS

Co–pending U.S. patent application Serial No. 08/700,998, filed Aug. 21, 1996, entitled "Personality Module and System for Controlling Multi–Media Devices Matrix".

*Primary Examiner*—Glenn A. Auve
*Assistant Examiner*—Raymond N Phan
*Attorney, Agent, or Firm*—Banner & Witcoff, Ltd.

[57] ABSTRACT

The invention provides a power saving feature in a computer system such as a desktop computer using the Windows™ operating system. The computer system includes one or more "sleep" buttons which selectively reduce power consumption to subsystems based on the status of various consumer devices which share the subsystems with a computer function of the system. From the user's perspective, each sleep button acts as a power switch for the computer but not for devices associated with the computer. Each sleep button transitions the computer from its normal power-on state to one or more power saving states depending on which consumer devices are active.

28 Claims, 20 Drawing Sheets

| CONSUMER DEVICE ON | | HARD DISK | FLOPPY DISK | KB CONTR. | MOUSE | CPU | VIDEO CONTR. | COMM. PORTS | PERS. MODULE | CD CONTR. | AUDIO CONTR. |
|---|---|---|---|---|---|---|---|---|---|---|---|
| TV | SLEEP ON | | | | | ✓ | ✓ | | AS NEEDED | | ✓ |
| | SLEEP OFF | | | | | ✓ | ✓ | | ✓ | | ✓ |
| FM RADIO | SLEEP ON | | | | | ✓ | | | AS NEEDED | | ✓ |
| | SLEEP OFF | | | | | ✓ | | | ✓ | | ✓ |
| CD PLAYER | SLEEP ON | | | | | AS NEEDED | ✓ | | AS NEEDED | ✓ | ✓ |
| | SLEEP OFF | | | | AS NEEDED | AS NEEDED | ✓ | | ✓ | ✓ | ✓ |
| TEL. & ANSW. MACH. | SLEEP ON | AS NEEDED | | AS NEEDED | | ✓ | | AS NEEDED | AS NEEDED | | AS NEEDED |
| | SLEEP OFF | AS NEEDED | | ✓ | ✓ | ✓ | ✓ | ✓ | ✓ | | |
| COMPUTER APPLICATION | SLEEP ON | AS NEEDED | | | | | | | AS NEEDED | AS NEEDED | |
| | SLEEP OFF | AS NEEDED | AS NEEDED | | | ✓ | ✓ | AS NEEDED | ✓ | AS NEEDED | ✓ |

PERIPHERAL/SUBSYSTEM

FIG. 4A

APM OEM INSTALLATION CHECK

| CALLED WITH: | AH = 53h APM<br>AL = 80h OEM APM<br>BH = 7Fh INSTALLATION CHECK |
|---|---|
| RETURNS: | CARRY = 0 SUCCESSFUL<br>BX = OEM ID (5262h FOR TOSHIBA AMERICA)<br><br>CARRY = 1 UNSUCCESSFUL<br>AH = ERROR CODE<br>03h INTERFACE NOT CONNECTED<br>86h FUNCTION NOT SUPPORTED |
| DESCRIPTION: | USED BY TAPM TO VERIFY THAT THE BIOS WILL SUPPORT OEM APM EVENT CALLING. IF THE RETURN CODE IS NOT 0 (SUCCESSFUL), THE TAPM DRIVER WILL NOT LOAD AND APM HANDLING WILL REVERT TO EITHER THE SYSTEM SUPPLIED POWER MANAGEMENT, OR NO POWER MANAGEMENT. |

FIG. 13

OEM LAST POSTING CAUSE

| CALLED WITH: | AH = 53h APM<br>AL = 80h OEM APM<br>BH = 00h LAST POSTING CAUSE |
|---|---|
| RETURNS: | CARRY = 0 SUCCESSFUL<br>AH, AL, BH UNCHANGED<br>CX = 0 ANY ACTIVE SYSTEM IRQ<br>CX = 1 FRONT BEZEL SLEEP BUTTON<br><br>CARRY = 1 UNSUCCESSFUL<br>AH = ERROR CODE<br>03h INTERFACE NOT CONNECTED<br>86h FUNCTION NOT SUPPORTED |
| DESCRIPTION: | CALLED BY THE TAPM DRIVER TO DETERMINE IF IT WAS THE FRONT BEZEL BUTTON THAT CAUSED THE POSTED APM EVENT. |

FIG. 14

| OEM | PERSONALITY MODULE MODE ENABLE / DISABLE |
|---|---|
| CALLED WITH: | AH = 53h APM<br>AL = 80h OEM APM<br>BH = 01h PERSONALITY MODULE MODE ENABLE / DISABLE<br>CX = 0 DISABLE<br>CX = 1 ENABLE |
| RETURNS: | CARRY = 0 SUCCESSFUL<br>    AH, AL, BH, CX UNCHANGED<br><br>CARRY = 1 UNSUCCESSFUL<br>    AH = ERROR CODE<br>        03h INTERFACE NOT CONNECTED<br>        0AH PARAMETER OUT OF RANGE<br>        86h FUNCTION NOT SUPPORTED |
| DESCRIPTION: | USED BY THE TAPM DRIVER TO PLACE THE BIOS INTO TOSHIBA OEM MODE AT STARTUP. CALLED AGAIN TO DISABLE TOSHIBA OEM MODE WHEN THE DRIVER IS UNLOADED. |

FIG. 15

| | |
|---|---|
| OEM | PASSWORD INSTALLATION CHECK |
| CALLED WITH: | AH = 53h APM<br>AL = 80h OEM APM<br>BH = 02h PASSWORD INSTALLATION CHECK |
| RETURNS: | CARRY = 0 SUCCESSFUL<br>AH, AL, BH UNCHANGED<br><br>CX = 0 USER PASSWORD NOT INSTALLED<br>CX = 1 USER PASSWORD INSTALLED<br><br>CARRY = 1 UNSUCCESSFUL<br>AH = ERROR CODE<br>03h INTERFACE NOT CONNECTED<br>86h FUNCTION NOT SUPPORTED |
| DESCRIPTION: | USED TO DETERMINE IF THE SYSTEM PASSWORD HAS BEEN SET IN THE BIOS. THE SYSTEM PASSWORD CAN ONLY BE ENABLED/DISABLED BY THE BIOS. |

FIG. 16

| OEM | PM INACTIVITY TIMER DURATION |
|---|---|
| CALLED WITH: | AH = 53h APM<br>AL = 80h OEM APM<br>BH = 03h INACTIVITY DURATION IN PM MODE<br>CX = 0 ... FFh (EXCLUDING 01h) |
| RETURNS: | CARRY = 0 SUCCESSFUL<br>　　AH, AL, BH, CX UNCHANGED<br><br>CARRY = 1 UNSUCCESSFUL<br>　AH = ERROR CODE<br>　　03h INTERFACE NOT CONNECTED<br>　　0Ah PARAMETER (CX) OUT OF RANGE<br>　　10h PERSONALITY MODE DISABLED<br>　　86h FUNCTION NOT SUPPORTED |
| DESCRIPTION: | USED TO (RE)SET THE VALUE TO BE USED BY THE INACTIVITY TIMER. COMMONLY USED TO STOP THE INACTIVITY TIMER FROM GENERATING EVENTS WHILE IN TAPM SLEEP MODE. |

FIG. 17

| OEM | POST MESSAGE |
|---|---|
| CALLED WITH: | AH = 53h APM<br>AL = 80h OEM APM<br>BH = 05h POST MESSAGE<br>CX = MESSAGE NUMBER |
| RETURNS: | CARRY = 0 SUCCESSFUL<br>   AH, AL, BH, UNCHANGED<br><br>CARRY = 1 UNSUCCESSFUL<br>   AH = ERROR CODE<br>      03h INTERFACE NOT CONNECTED<br>      0Ah BAD PARAMETER<br>      86h FUNCTION NOT SUPPORTED |
| DESCRIPTION: | USED TO POST AN APM MESSAGE TO THE SYSTEM BIOS. TYPICAL MESSAGES INCLUDE SUSPEND AND STANDBY. |

FIG. 18

METHOD AND APPARATUS FOR A COMPUTER POWER MANAGEMENT FUNCTION INCLUDING SELECTIVE SLEEP STATES

CROSS-REFERENCE TO RELATED APPLICATIONS

This application is related in subject matter to copending, commonly owned application Ser. No. 03/700,998 entitled "Personality Module and System for Controlling Multi-Media Devices", filed on Aug. 21, 1996, which is incorporated by reference herein.

BACKGROUND OF THE INVENTION

1. Technical Field

This invention relates generally to an apparatus and method for saving power in a computer system such as a desktop or notebook type system. More particularly, the invention provides one or more "sleep" buttons which selectively power down different subsystems in a computer system on the basis of the status of various user-controlled consumer devices.

2. Related Information

Over the past several years, the electricity consumed by desktop computer systems has generally increased due to higher processor speeds, proliferation of peripherals, the use of larger displays, and other factors. Moreover, the increase in the number of computers has caused a corresponding increase in the total amount of electricity consumed. The increased electrical consumption generally harms the environment, thus prompting the Environmental Protection Agency to encourage computer makers to design computer systems with reduced power consumption. For portable computers such as so-called laptop or notebook style computers, power consumption is also a paramount concern.

Power saving features for general purpose computer systems such as desktop and notebook computer systems are well known. Some systems rely on a power management function which automatically transitions the computer to one or more power-saving states when no activities are detected. The power saving states are characterized by reduced power consumption and a reduced state of readiness. Such systems are typically designed on the assumption that a particular computer has a fixed configuration of components and peripherals. Accordingly, such techniques are not readily useful in systems which provide a wide variety of components having different power states of their own. Moreover, the user of such systems cannot directly control the power-down or re-awakening of the system since the transitions are typically predefined based on a rigid set of parameters.

Other systems provide a "suspend" mode which, when activated, slows down or stops the CPU clock, spins down the disk drive, sets the computer monitor in a "suspend" state, saves the state of various application programs, and stops most other peripheral functions. Thereafter, any interrupt such as a keyboard or modem interrupt will immediately re-activate the entire computer and suspended application programs. Such an approach still wastes more power than is necessary, because the entire system is either on or off, and a single modem interrupt can cause the full system to be powered up even though full power is not needed to service the function of interest.

Recently, personal computer systems have begun to converge with consumer devices such as televisions, radios, CD players, answering machines, and the like. These integrated systems have increased complexity, making it more difficult to apply conventional power management techniques.

As one example, when a television receiver is integrated into a personal computer (i.e., the television display shares the computer screen with application programs), conventional power management techniques are inappropriate. In particular, the display must remain energized to support the TV function even though other subsystems of the underlying computer may not be in use. Because conventional power management functions would automatically turn off the display when the underlying computer is not being used, such conventional methods would effectively shut down the TV function while it was in use. Conversely, leaving all peripherals powered up when only the TV function is used wastes power. Providing separate "off" switches for each device or combination of devices is too confusing and still does not solve many of the aforementioned problems. Consequently, a need exists for more sophisticated power saving techniques when consumer devices are integrated into personal computer system, such that the power management features have knowledge of the applications which are currently being used.

SUMMARY OF THE INVENTION

The present invention overcomes the aforementioned problems by providing one or more "sleep" buttons for a computer system and a plurality of power saving states each having different power saving behavior. Instead of using a power switch, the user is encouraged to press one of the "sleep" buttons which reduces power to various subsystems only after checking to see whether some of the subsystems should remain active to support an active consumer device such as a television or radio. In order to re-awaken the computer and thus restore full power, the user again presses one of the "sleep" buttons. Alternatively, the user may activate one of the consumer devices to re-activate the subsystems necessary to support that particular device.

According to one aspect of the invention, the various computer subsystems may support computer-controlled consumer devices such as a television receiver integrated into the computer, a CD player, FM radio, answering machine, and the like.

According to another aspect of the invention, a conventional power management function for a video device is disabled and replaced with a power management function which uses a different set of criteria for determining when to power down the video device.

Additional features and advantages of the invention will become apparent through the following description, the figures, and the appended claims.

BRIEF DESCRIPTION OF THE DRAWINGS

FIG. 4A is a table depicting a system in which certain subsystems are prevented from changing into a power saving mode depending on the status of consumer devices and also depending on whether a sleep mode is active.

FIG. 13 shows an APM OEM installation check function which can be provided in a Basic Input/Output System (BIOS).

FIG. 14 shows an OEM last posting cause function which can be provided in a BIOS.

FIG. 15 shows an OEM personality module mode enable/disable function which can be provided in a BIOS.

FIG. 16 shows an OEM password installation check which can be provided in a BIOS.

FIG. 17 shows an OEM personality module inactivity timer duration function which can be provided in a BIOS.

FIG. 18 shows an OEM post message function which can be provided in a BIOS.

DETAILED DESCRIPTION OF THE PREFERRED EMBODIMENTS

Figure 1:
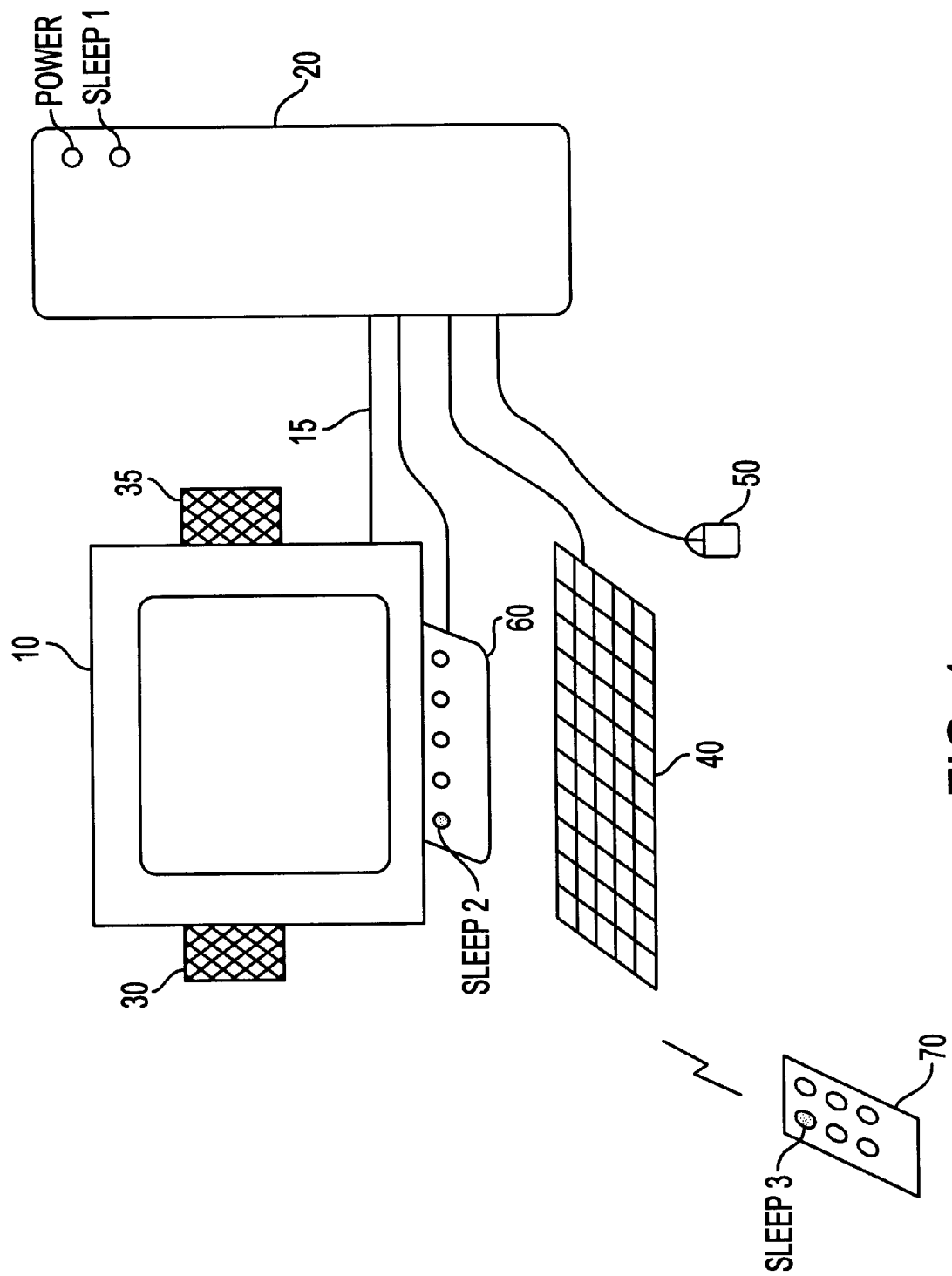
FIG. 1 shows a computer system employing multiple sleep buttons SLEEP1, SLEEP2 and SLEEP3 in addition to a normal power switch POWER according to one embodiment of the present invention.

FIG. 1 shows a computer system employing multiple sleep buttons according to various aspects of the invention. As shown in FIG. 1, a computer monitor 10 is coupled to a computer chassis 20 via one or more audio/video cables 15. Computer chassis 20 includes a conventional power switch POWER and a first sleep button SLEEP1. Power switch POWER is a "hard" power switch which controls the physical power source to the computer system including all of its peripherals. When it is switched off, no power flows to any devices or subsystems. Sleep button SLEEP1 acts as a "soft" power switch which toggles the system between a fully powered state and one or more power-saving states described in more detail below.

As is conventional, speakers 30 and 35 may be attached to the side of monitor 10. A conventional computer keyboard 40 and mouse 50 may also be coupled to chassis 20 through one or more cables.

A personality module 60 (such as the type described in copending U.S. application Ser. No. 08/700,998) may be removably attached to monitor 10 and coupled to chassis 20 through a cable which connects through a Universal Serial Bus (USB) port. Personality module 60 includes a plurality of buttons and indicators which permit a user to control consumer devices associated with the computer system. In one embodiment, one of the buttons on personality module 60 is a second sleep button SLEEP2 which performs a function identical to that of sleep button SLEEP1 on chassis 20.

Optionally, a remote control device 70 which implements some or all of the features of personality module 60 may also be used to control the system. As shown in FIG. 1, remote control device 70 includes yet a third sleep button SLEEP3 which performs functions identical to that of sleep buttons SLEEP1 and SLEEP2. In various embodiments, remote control device 70 communicates with personality module 60 via an infrared light beam.

Figure 2:
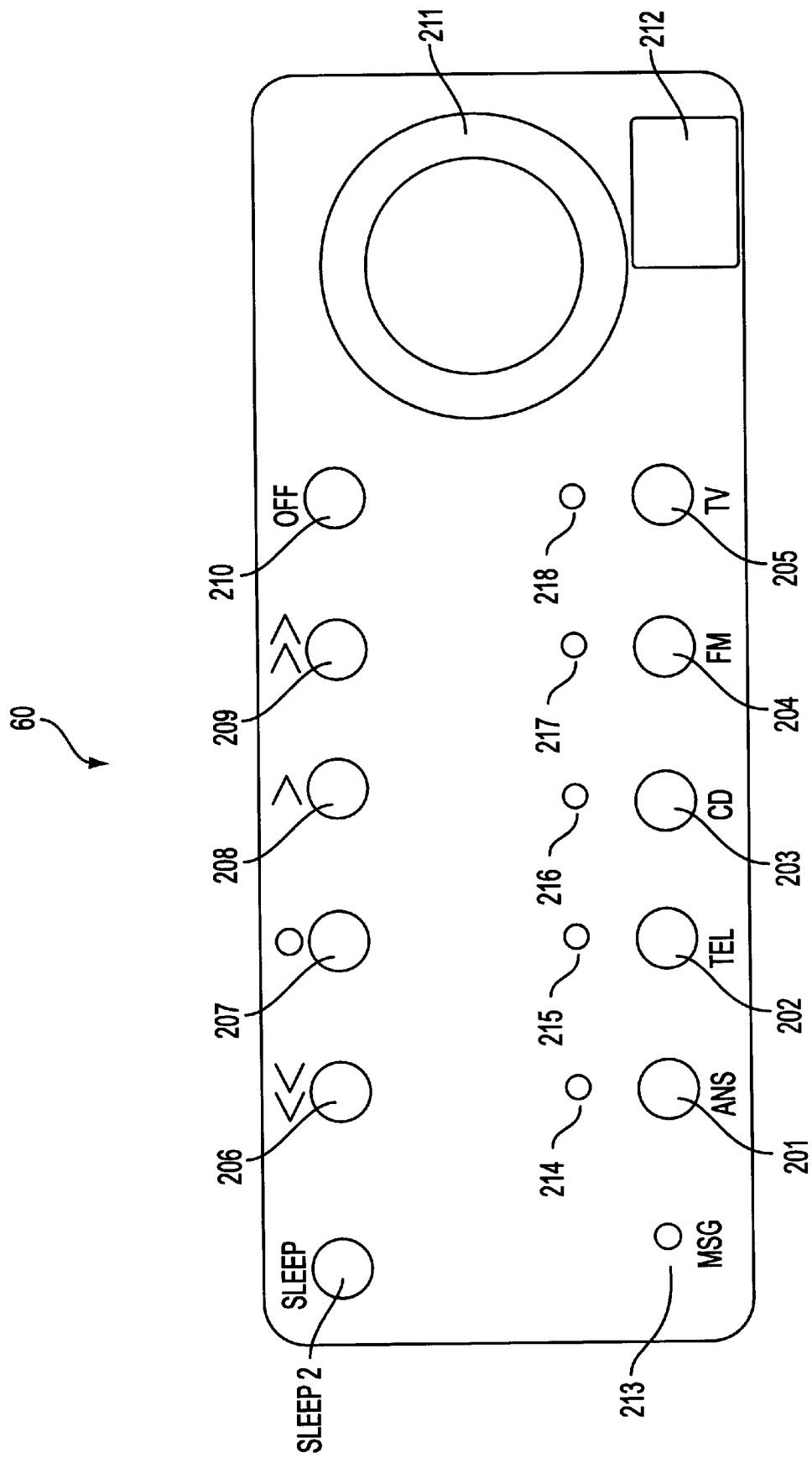
FIG. 2 shows one embodiment of a personality module (PM) including a sleep button SLEEP2 according to the present invention.

FIG. 2 shows one possible configuration for personality module 60 of FIG. 1. Sleep button SLEEP2 in the upper left corner corresponds to sleep button SLEEP2 of FIG. 1. A plurality of mode buttons 201 through 205 can be used to select and activate different consumer devices such as an answering machine, telephone, CD player, FM radio, and TV. These devices may be implemented as functions integrated into a multitasking windowed operating system such as Microsoft's Windows95™. The illustrated consumer devices are exemplary only and are not intended to be limiting. In addition to these consumer devices, conventional computer applications can be active within the system at the same time (e.g., spreadsheets, word processing programs, e-mail, and the like).

The TV consumer device may be implemented using a plug-in board which demodulates television signals and generates an output which is displayed on monitor 10 of FIG. 1. Pressing TV button 205 activates the TV function and causes a window to be opened on the display window containing a broadcast ("live") TV program. Similarly, the CD player device may be implemented using the computer system's CD-ROM drive and a corresponding computer program which decodes music encoded on a CD and causes a corresponding audio signal to be generated in speakers 30 and 35 of FIG. 1.

Indicator lights 214 through 218 indicate which consumer device is selected. Although not shown in FIG. 2, each consumer device may display various information on the computer display (e.g., an FM radio dial for the FM radio; a current TV channel number for the TV, etc.).

A plurality of function buttons 206 through 210 can be used to control functions specific to the selected consumer device. Thus, for example, a forward button 208 can be used to cause the FM radio device to advance to the next FM radio station. If the TV device is active, forward button 208 can be used to cause the TV to advance to the next TV station. Thus, function buttons 206 through 210 are preferably context sensitive. A volume control knob 211 can be used to change the volume of various devices. An infrared receiver 212 can be used to interface to a remote control device such as device 70 of FIG. 1.

As described in the above referenced copending patent application, personality module 60 may use a reconfigurable LCD-type display to provide icons and other information related to user-controllable functions.

Figure 3:
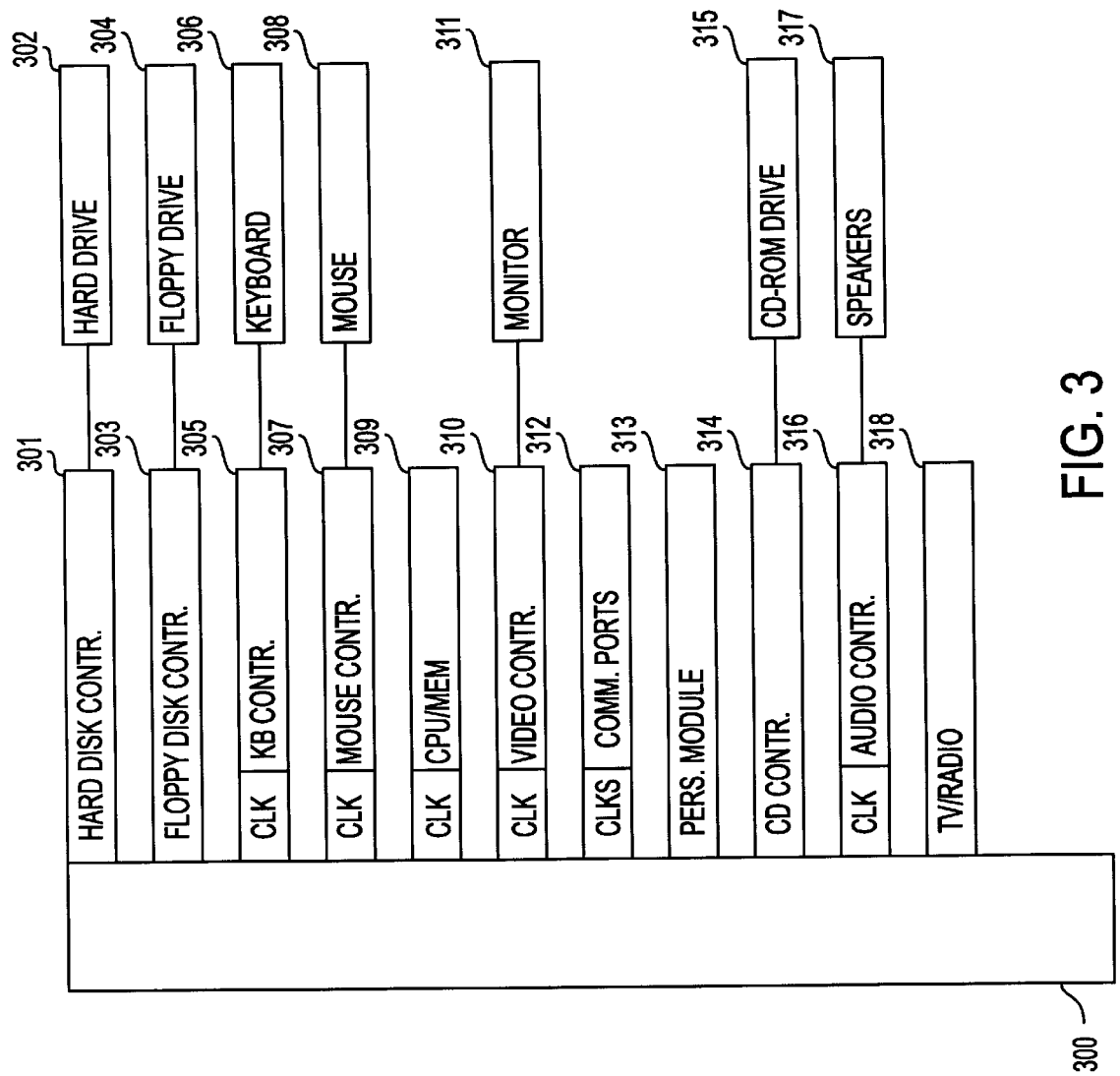
FIG. 3 shows a computer system including various subsystems which can be enclosed within a housing and connected to a common backplane, wherein each subsystem can be separately controlled to assume a power saving mode.

FIG. 3 shows a computer system including various subsystems which may be enclosed within a housing and connected via a backplane 300. In various embodiments, a system according to the present invention transitions among multiple power saving states by disabling or slowing down individual subsystems according to criteria established by the state of active consumer devices and the state of one of the "sleep" buttons. Whether power will be reduced or eliminated to a particular one of the subsystems is determined not only by conventional parameters such as inactivity during an extended time period, but also by other parameters such as whether one of the consumer devices (TV, radio, etc.) is presently being used and whether the user has pressed a "sleep" button. Power savings can be achieved by selectively disabling or slowing down clocks associated with the subsystems, or by issuing commands to individual subsystems to reduce power. The selective power management function can be implementing in software executing on the system CPU, as described in more detail herein.

For example, hard disk controller 301 and an associated hard disk drive 302 can be placed in a power saving mode by issuing a command to hard disk controller 301. In response hard disk controller 301 spins down the hard disk drive and transitions to a standby state. Floppy disk controller 303 operates in a similar manner. The keyboard 306 can be disabled by slowing down or stopping the associated keyboard controller clock (part of keyboard controller 305). The mouse can be disabled in a similar manner.

A CPU/memory subsystem 309 can be placed in a power saving mode by slowing down an associated CPU clock, typically to 4 MHZ or so. Note that the CPU clock is typically not stopped completely unless power is physically removed, as this would prevent the power management software from executing. The monitor can be placed in a power saving mode by slowing down a video controller clock (part of video controller 310), or a command can be issued to the controller to assume one or more reduced power states. Similarly, other peripheral devices or subsystems 312 through 317 can be placed in power saving states independently by either slowing down clocks or issuing appropriate controller commands.

A combined TV/radio subsystem 318 is shown in FIG. 3. Although not explicitly shown, this subsystem can be coupled to video controller 310 and audio controller 316 to provide demodulated video and audio signals for display on monitor 311 and output through speakers 317.

FIG. 4A is a table which shows various aspects of a system employing principles of the present invention. As shown, certain subsystems are prevented from changing into a power saving mode depending on the status of various consumer devices and depending on whether a sleep button has been pressed. In this embodiment, certain peripheral devices or subsystems remain active (i.e., not be disabled) to support an active consumer device. In general, subsystems which are not needed can be disabled to save power, unless the subsystem is needed for an active consumer device. If one of the sleep buttons in the system has been pressed (i.e., the system is in a "sleep" state), the selective disabling of subsystems operates differently than if the system were in a complete active state.

As shown in FIG. 4A, four consumer devices 401 through 404 and a conventional computer application 405 are listed in the leftmost column of the table. Ten peripherals/subsystems are listed across the top of the table. Check marks in the table of FIG. 4A indicate those subsystems which are needed to support a particular consumer device when that device is "on" (i.e, in use by a user). The term "as needed" in the table indicates that the subsystem will be disabled after a period of inactivity of that subsystem, but can be quickly reactivated when the particular consumer device needs it. Note that certain subsystems can be selectively disabled depending not only upon whether a particular consumer device is active, but also depending on whether the system has been placed in a "sleep" state (see "sleep on" and "sleep off" column next to each consumer device in FIG. 4A). Thus, before a particular subsystem is disabled, a check is made to determine whether that particular subsystem is needed for an active consumer device.

Beginning with row 401, when the TV consumer device is on and the sleep button has not been pressed ("sleep off"), then the CPU, video controller, personality module, and audio controller subsystems must remain active (i.e., they are prevented from changing to a power saving mode). Thus, as long as the user watches TV, these subsystems will remain active. Other subsystems, however, such as the hard disk, keyboard controller and CD controller can be placed in a power saving mode if the system is otherwise inactive and they are not needed for another active consumer device. As shown in row 401, if the user presses the sleep button while watching TV ("sleep on"), the personality module can then be placed in a power saving mode (i.e., its clock can be slowed down) and only temporarily activated when needed (e.g., the user presses a function button). Thus, the power saving behavior of the system acts differently depending not only on the status of the consumer device, but also depending on whether a sleep mode has been activated.

In row 402, when the user is using the FM radio and the sleep button has not been pressed ("sleep off"), the CPU, video controller (to support a visual display of the radio dial), personality module, and audio controller must remain active (i.e., none of these subsystems will be disabled). Other unnecessary subsystems can be placed into a power saving mode.

However, if the user presses the sleep button ("sleep on"), the video controller can also be disabled, and the personality module can be disabled as needed (i.e., its clock can be slowed down) and only activated when needed (e.g., the user changes the channel). In accordance with this aspect of the embodiment, pressing the sleep button when only the FM radio is active will turn off the display, including the display of a radio dial previously provided to the user. Pressing the sleep button again (causing the system to return to the sleep "off" state) would re-activate the radio dial display.

In one embodiment, pressing the sleep button while the TV device is active not only changes the power saving behavior as shown in FIG. 4A, but also changes the size of the display window of the TV device to a larger size; e.g., to a full screen format. Thus, for example, pressing the sleep button when only the TV device is active converts the computer system into only a full-size TV display device and disables other subsystems which are not needed to support the TV function.

Figure 4B:
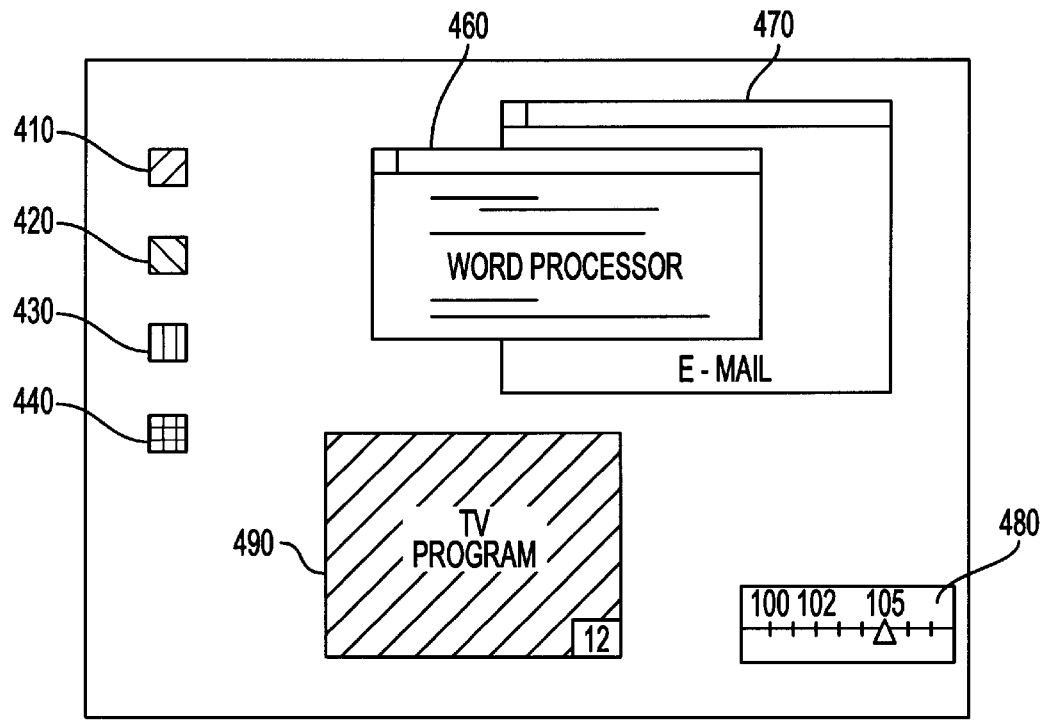
FIG. 4B shows a computer display when a computer system is in a non-sleep state according to one aspect of the present invention.
Figure 4C:
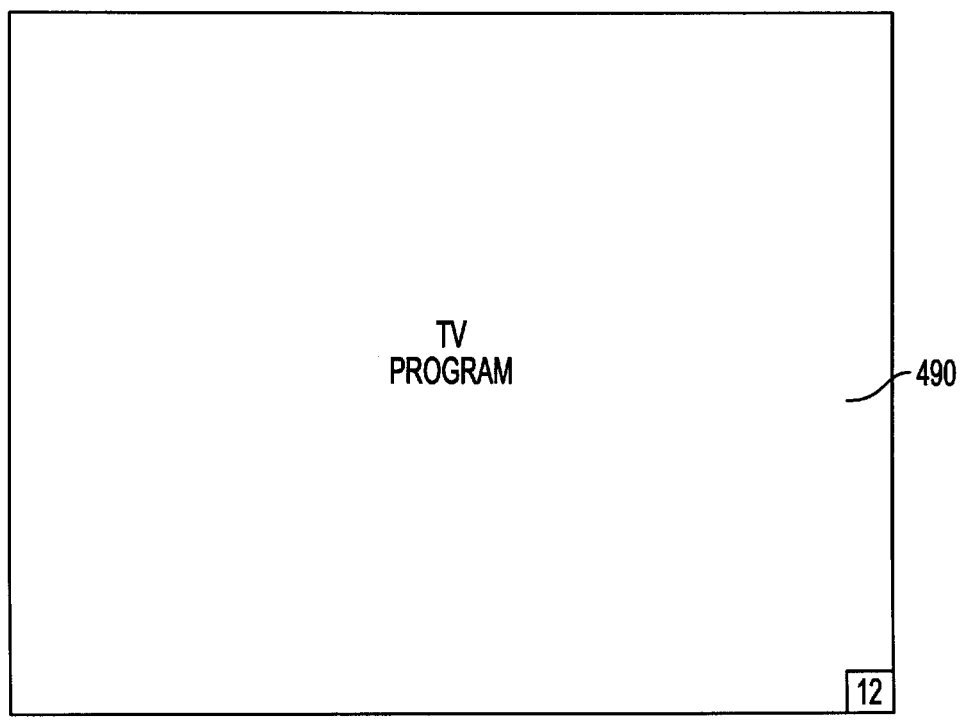
FIG. 4C shows a computer display when a computer system is in a sleep state with a TV consumer device active according to one aspect of the present invention.

The above behavior is illustrated in FIGS. 4B and 4C. FIG. 4B, which corresponds to a non-sleep state, shows a computer display on which a plurality of icons 410 through 440 appear. A plurality of windows 460 through 490 are simultaneously displayed in a multitasking environment, each window containing information for a conventional computer application program or for a consumer device. For example, two application programs shown in FIG. 4B include a word processor 460 and an e-mail program 470. Similarly, two consumer devices include an FM radio with a corresponding dial display 480 and a TV with a corresponding display window 490 including a channel indicator in the lower right corner. Some embodiments of the invention may not permit the simultaneous operation of both a TV and radio.

When the user presses the sleep button, the display transitions from that shown in FIG. 4B to that shown In FIG. 4C, wherein the TV window is expanded in size to take up all or substantially all of the available display space. The other windows are removed from view and applications suspended. Were the user to turn off the TV device, the display would be placed into a power saving mode. However, turning on the TV again would reactivate the TV display window without reactivating all of the suspended application programs and without providing power to all of the other subsystems.

Returning to FIG. 4A at row 403, when the user is using the CD player and the sleep button has not been pressed, the CPU, video controller, personality module, CD controller, and audio controller are prevented from being disabled. However, other subsystems such as the hard disk, keyboard controller and mouse can be disabled. If the user presses the sleep button, the CPU and personality module can be disabled as needed (i.e., only activated when specifically needed to support an operation).

In row 404, when the telephone and answering machine device is being used and the sleep button has not been pressed, the CPU, video controller, communication port(s), personality module and audio controller are prevented from being disabled. The hard disk, keyboard controller, and mouse can be disabled as needed (i.e., selectively disabled and then temporarily reactivated to support a particular function). When the user presses the sleep button, the keyboard controller and mouse can be disabled. Additionally, the CPU, communication port(s), personality module and audio controller can be selectively disabled (i.e., temporarily disabled and then temporarily reactivated to support a particular function).

Finally, row 405 corresponds to a traditional computer application program (e.g., spreadsheet, computer game, word processing program). When the sleep button has not been pressed, the keyboard controller, mouse, CPU, video controller, personality module, and audio controller are prevented from being disabled. The hard disk, floppy disk, communication ports, and CD controller can be selectively disabled as needed. When the sleep button is pressed, all peripherals except the personality module can be disabled, and any application programs are suspended. The personality module can be disabled as needed. Pressing the sleep button again (to awake from the sleep mode) causes the application programs to resume operation without the need to reboot the computer.

Although suspend and resume functions are well known (see, e.g., U.S. Pat. No. 5,355,490 to the present inventor), a system employing the present invention departs in several respects from the conventional suspend/resume behavior as explained above and set forth in more detail herein.

In one embodiment, power management functions can be implemented in one or more drivers which interface with a Basic Input/Output System (BIOS) component and an operating system component (e.g., a component of the Windows™ operating system). In certain embodiments, a conventional automatic power saving software function can be disabled and overwritten with a new function which uses the inventive principles. Further details of the software are provided herein.

Figure 5A:
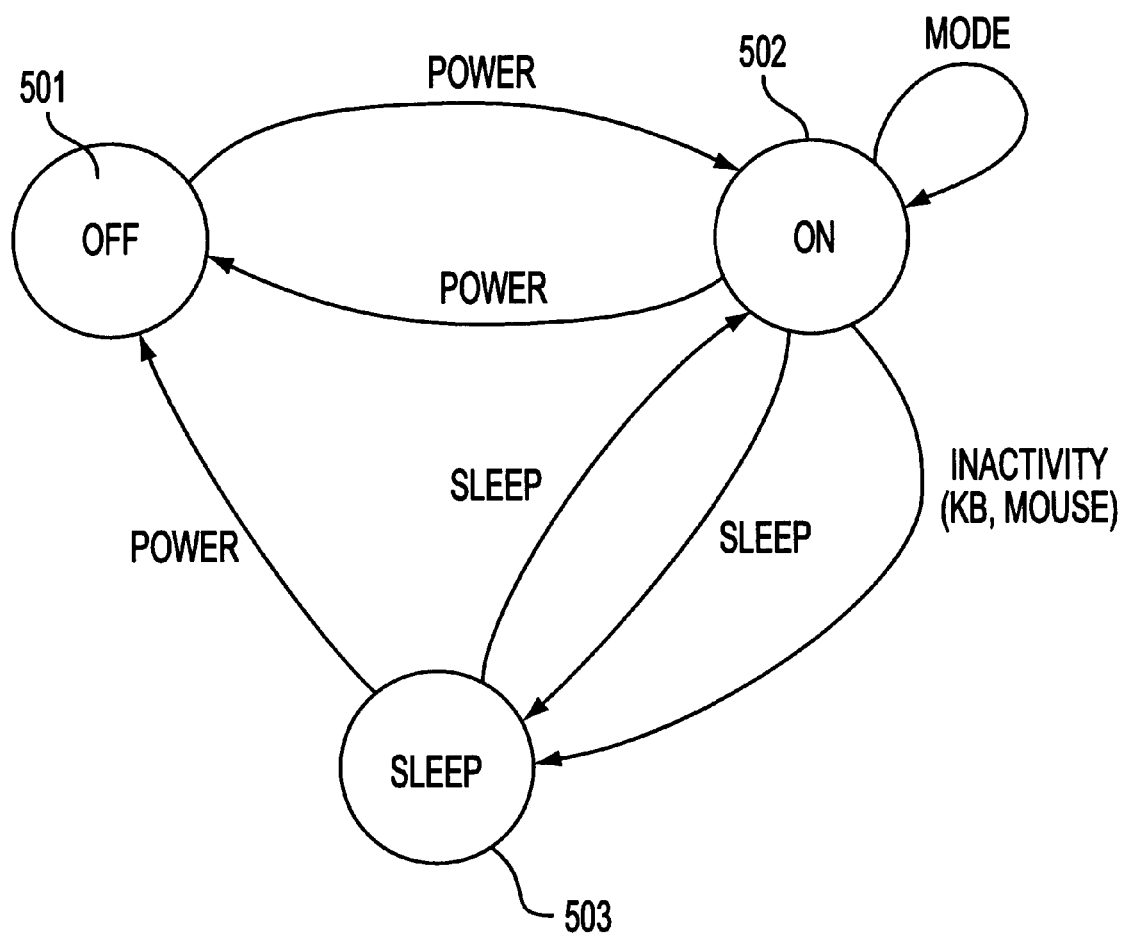
FIG. 5A is a state transition diagram illustrating how a user of the present invention perceives the power management features of the system.
Figure 5B:
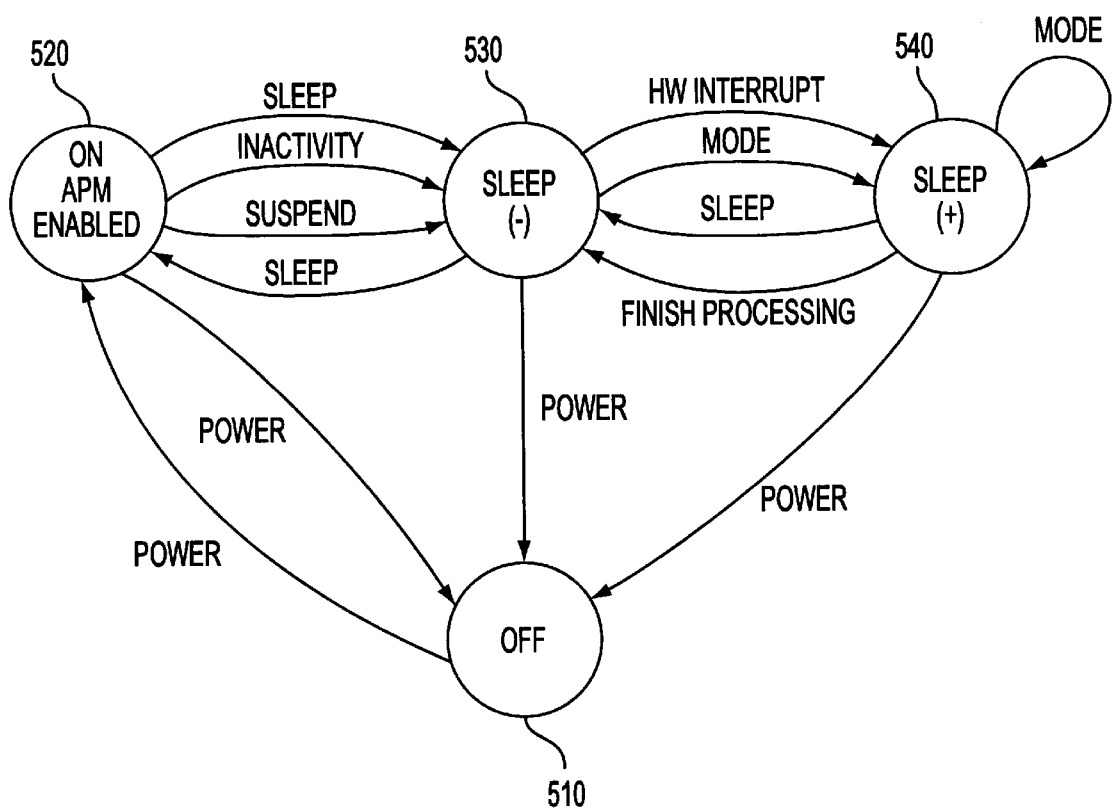
FIG. 5B is a state transition diagram illustrating how a system according to the present invention transitions through various power management states.
Figure 5C:
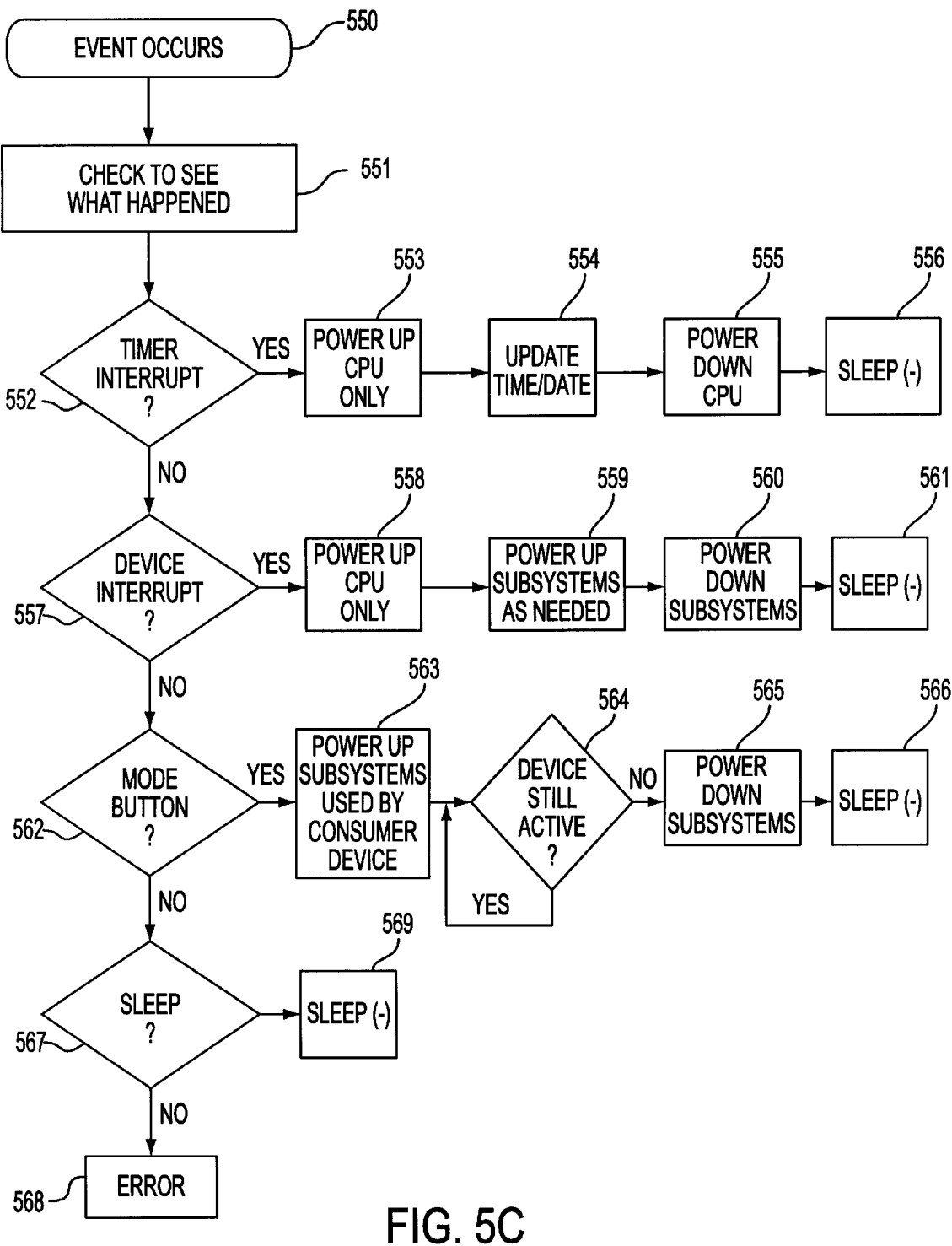
FIG. 5C is a flow chart illustrating one possible implementation for SLEEP(+) state 540 of FIG. 5B.

FIGS. 5A and 5B show state transition diagrams which illustrate the operation of a system employing various aspects of the present invention. FIG. 5A shows how a user of the computer system perceives the system states. FIG 5B shows how the system actually implements different types of sleep states depending on events in the system. FIG. 5C shows details of the SLEEP(+) state in FIG. 5B.

In FIG. 5A, OFF state 501 corresponds to total lack of power supplied to the system. Pressing the POWER switch transitions the system to ON state 502, and pressing the POWER switch from that state returns the system to OFF state 501. While in ON state 502, pressing any of the various mode buttons on the personality module does not alter the global system state (i.e., it remains in ON state 502). Pressing one of the SLEEP buttons, however, transitions the system to SLEEP state 503. In this state, the system behaves as described in the table of FIG. 4A. If no application programs are active and no consumer devices are active, all of the subsystems are placed into a power saving condition, except that the personality module may be activated on an "as needed" basis (e.g., if the user presses one of the buttons on the personality module, it temporarily resumes full power until the button press is serviced).

Similarly, inactivity over a period of time (e.g., two minutes) from the keyboard or mouse will cause the system to transition into SLEEP state 503. However, in contrast to conventional systems, the user must press one of the SLEEP buttons to return to ON state 502 (i.e., merely hitting the keyboard or mouse will not reawaken the system).

In general, from the user's perspective, pressing one of the SLEEP buttons while in SLEEP state 503 transitions the system back to ON state 502. Pressing the POWER button while in SLEEP state 503 transitions the system to OFF state 501.

FIG. 5B shows how a system employing certain principles of the invention transitions between various states, notwithstanding the user's perspective of states shown in FIG. 5A. To avoid confusion, the four states in FIG. 5B (ON APM ENABLED, SLEEP(−), SLEEP(+), and OFF) are labeled using different reference numerals from those in FIG. 5A.

In FIG. 5B, OFF state 510 is identical to OFF state 501 in FIG. 5A. In this state, no power is supplied to the subsystems. Pressing the POWER button from this state transitions the system to the ON APM ENABLED state 520. In state 520, an Advanced Power Management (APM) function is operative in accordance with the present invention to efficiently manage power to the subsystems. In this state, all subsystems are initially powered up and the system is booted up.

There are three ways the system can transition from ON APM ENABLED state 520 to a SLEEP(−) state 530: pressing the SLEEP button, inactivity of the keyboard and mouse, or the user can perform a conventional suspend operation (typically, through a start-up menu such as in Windows95™). Conversely, while in the SLEEP(−) mode, the system can transition back to the ON APM ENABLED state 520 if one of the SLEEP buttons is pressed.

In SLEEP(−) state 530, all application programs are suspended, the system state is saved, and power is reduced to the subsystems as shown in FIG. 4A. In other words, SLEEP(−) state 530 generally corresponds to "sleep on" in FIG. 4A, and the system saves energy by turning off subsystems which are not needed to operate any active consumer devices. Furthermore, as described previously, if the TV device is active in a window on the display, the display window can be expanded to cover the entire screen in this state. Note that, in contrast to conventional techniques, merely pressing a key on the keyboard or clicking on the mouse will not cause the system to return to ON APM ENABLED state 520; instead, the user must press one of the SLEEP buttons to return to state 520.

SLEEP(+) state 540 generally corresponds to the "as needed" indicators in the "sleep on" states of FIG. 4A. In other words, state 540 is typically entered temporarily as needed, and subsystems are powered up only as long as needed to support a particular function. However, in contrast to conventional systems, the entire system is typically not reawakened. A hardware interrupt or pressing one of the MODE buttons (e.g., button 205 in FIG. 2) causes state 540 to be entered. Examples of interrupts include a keyboard or mouse interrupt, or a real-time clock which generates an interrupt at a fixed time interval (e.g., every 18 milliseconds).

In SLEEP(+) state 540, the CPU is temporarily speeded up to service the interrupt, and the power management function according to the present invention determines what type of event occurred. As described in more detail herein, certain actions are taken to service the event. After the processing is finished, the system may be returned to the SLEEP(-) state 530. For example, if no consumer devices are active, the system returns to state 530. Pressing one of the SLEEP buttons also transitions the system back to state 530. It is anticipated that the system will spend very little time in state 540, and thus most of the time will be spent in the maximum power saving state 530.

FIG. 5C explains in more detail processing which can occur in SLEEP(+) state 540. These steps may be implemented in an operating system driver which is activated upon occurrence of an event.

In step 550, an event (e.g., hardware interrupt) is presumed to have occurred which transitions the system between SLEEP(-) state 530 to SLEEP(+) state 540. In step 551, a check is made to determine what type of event occurred.

In step 552, a test is performed to determine whether the event is a timer interrupt. If so, then in step 553 only the CPU is brought back to full power. The time and date is updated in step 554 and, in step 555, the CPU is placed back into a reduced power state (e.g., clock reduced). Thereafter, the system immediately transitions back into the SLEEP(-) state.

In step 557, a test is performed to determine whether the event is a device interrupt. Examples include keyboard interrupts, communication port interrupts (e.g., incoming telephone call), mouse interrupts, and the like. In step 558, the CPU is powered up and processing is performed to determine which, if any, subsystems are needed to support the device interrupt. Typically, keyboard and mouse interrupts can be ignored and the system can be transitioned back to the SLEEP(-) state. If, however, an incoming telephone call causes a communication port interrupt to occur, then certain subsystems may need to be activated to support the telephone and answering machine consumer device (see FIG. 4A). Accordingly, those subsystems are reactivated long enough to support the required function.

For example, the communication port clock for the active port is returned to full speed, and the audio controller clock is commanded to return to full speed. However, rather than causing a system-wide resume operation to occur, only those subsystems needed to support the function are reactivated, and a "user resume" message can be sent to the affected function or consumer device (e.g., telephone/answering machine). When the function is completed, the subsystems are powered down (step 560) and the system reverts to the SLEEP(-) state in step 561.

In step 562, a test is performed to determine whether one of the MODE buttons (e.g., TV, FM radio, etc.) has been pressed. If so, then in step 563, those subsystems needed to support the consumer device (see FIG. 4A) are activated. In step 564, for as long as the consumer device is still active, the required subsystems remain powered up. However, when the device is no longer active (e.g., the user turns it off), the subsystems are powered down in step 565 and the system reverts to the SLEEP(-) state in step 566.

In step 567, a test is performed to determine whether the user has pressed one of the SLEEP buttons. If so, then the SLEEP(-) mode is entered in step 569, thus causing systems to be powered down.

Figure 6:
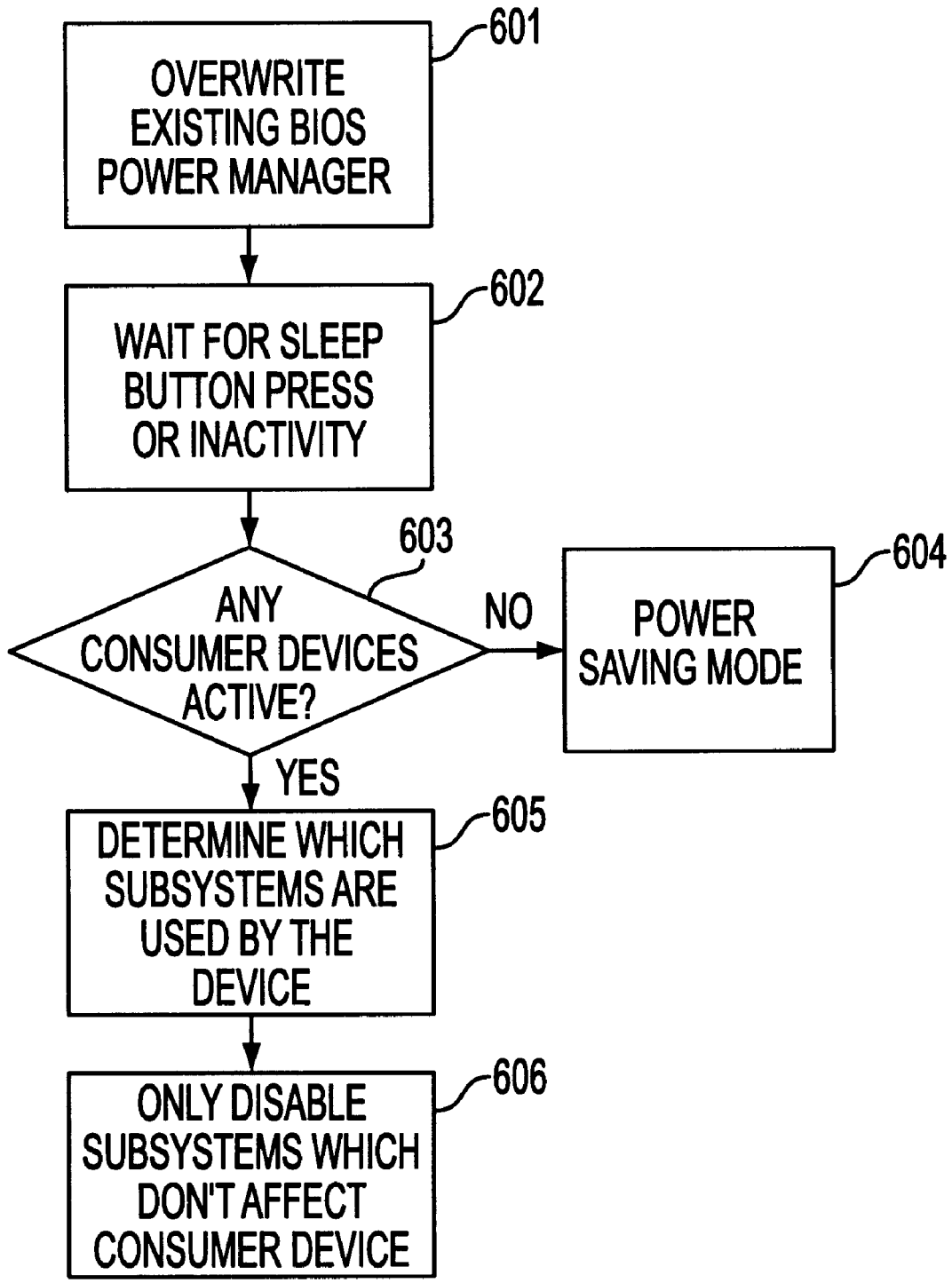
FIG. 6 is a simplified flow chart illustrating selective power management features in accordance with the present invention.

FIG. 6 provides a simplified flow chart for performing certain steps in accordance with one aspect of the present invention. Beginning in step 601, an existing power management function in the BIOS or other part of the operating system is overwritten with a modified power management function which manages power according to the present invention.

For example, any existing function which automatically disables the video display after a predetermined period of inactivity is replaced so that the video display is not automatically set into a low power state upon system inactivity. According to the present invention, before the video display is disabled, a check is first made to determine whether any consumer devices such as a television function are presently active and thus using the video display.

In step 602, when one of the SLEEP buttons is pressed, or after a period of inactivity, then processing advances to step 603. In step 603, a check is made to determine whether any consumer devices (i.e., devices outside of the traditional user computing functions) are active. Examples include, but are not limited to: a television receiver, a radio receiver, fax/modem/answering machine, compact disk player, or telephone. If no consumer devices are active, then in step 604 a power saving mode is entered. This may be characterized by reducing power to various subsystems by reducing clock speeds and/or issuing commands to each subsystem to assume a low power state.

If any consumer devices are active, then in step 605 a determination is made as to which subsystems are used by the particular consumer device. As one example, if the television is active, then the display subsystem is in use. However, if the CD player or FM radio are in use, then the display is not in use and can be switched to a low power state. Thereafter, in step 606, only those subsystems which are not used by the active consumer device are disabled.

FIGS. 7 through 11 show one possible software implementation technique according to the present invention. This technique includes installing a new device driver and making use of certain Windows™ broadcasting messages.

Figure 7:
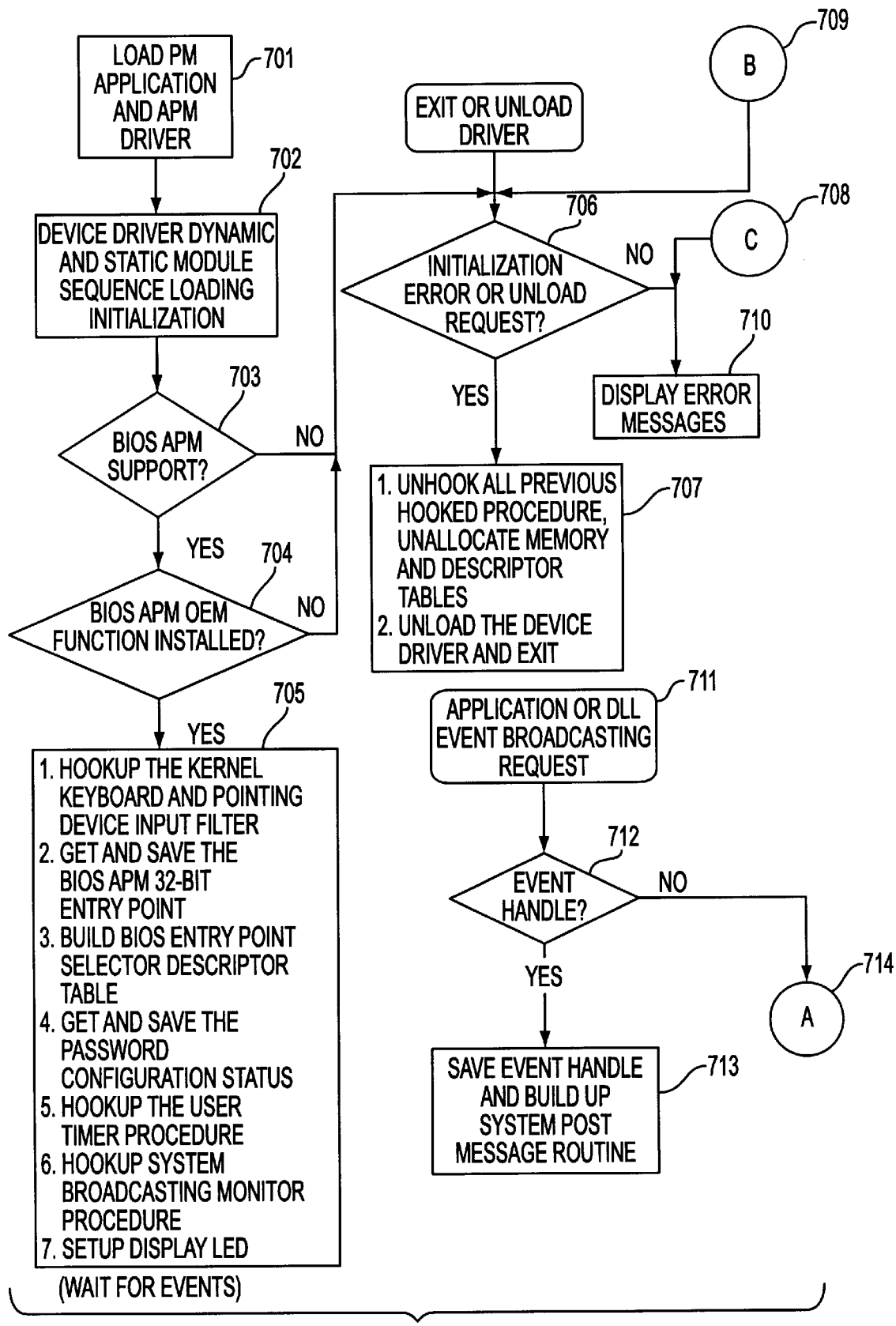
FIG. 7 shows an APM VxD device driver loading process during an initialization phase.

FIG. 7 shows an APM VxD device driver loading process during an initialization phase. As described in more detail with reference to FIG. 12, one embodiment of the invention provides a power management application-level handler (APM application) which processes certain events in the system, and a new special-function device driver (APM VxD) which posts "fake" messages to Windows. For example, a fake "user resume" message is sent instead of the standard BIOS resume message. For certain types of events, the existing BIOS power management function is used to manage power; but for other types of events, the existing BIOS power management function is not used and the new driver is instead used.

In step 701, the power manager application and APM driver are installed. This entails registering the new application with the Windows™ operating system. The application thereafter installs the new APM driver. In step 702, the device driver dynamic and static module sequence loading is initialized (i.e., the driver is loaded and initialized). In step 703, a check is made to determine whether the BIOS supports advanced power management. If the installed BIOS does not already support power management, then termination processing occurs beginning in step 706 (i.e., it is presumed that a basic power management function exists).

In step 704, a check is made to determine whether a BIOS APM OEM function is installed (see FIG. 13). If not, then termination processing occurs beginning in step 706.

In step 705, several different substeps are performed. These include (1) hooking up to the keyboard interrupts (i.e., the new driver gets a copy of keyboard interrupts); (2) getting and saving the entry point for communicating with the APM BIOS; (3) building a selector; (4) checking to see whether a password has been set (if set, it must be saved, so that upon wakeup, the password can be checked); (5) hooking up the 18 millisecond timer; (6) hooking up to Windows™ to send all messages to the APM driver; and (7) initializing the power on light on the console (e.g., light on corresponds to power on; light off corresponds to power is off; and light blinking indicates sleep mode). After step 705, the driver waits for events to occur.

The termination processing in steps 706 and 707 is self-explanatory and no further elaboration is required.

Figure 8:
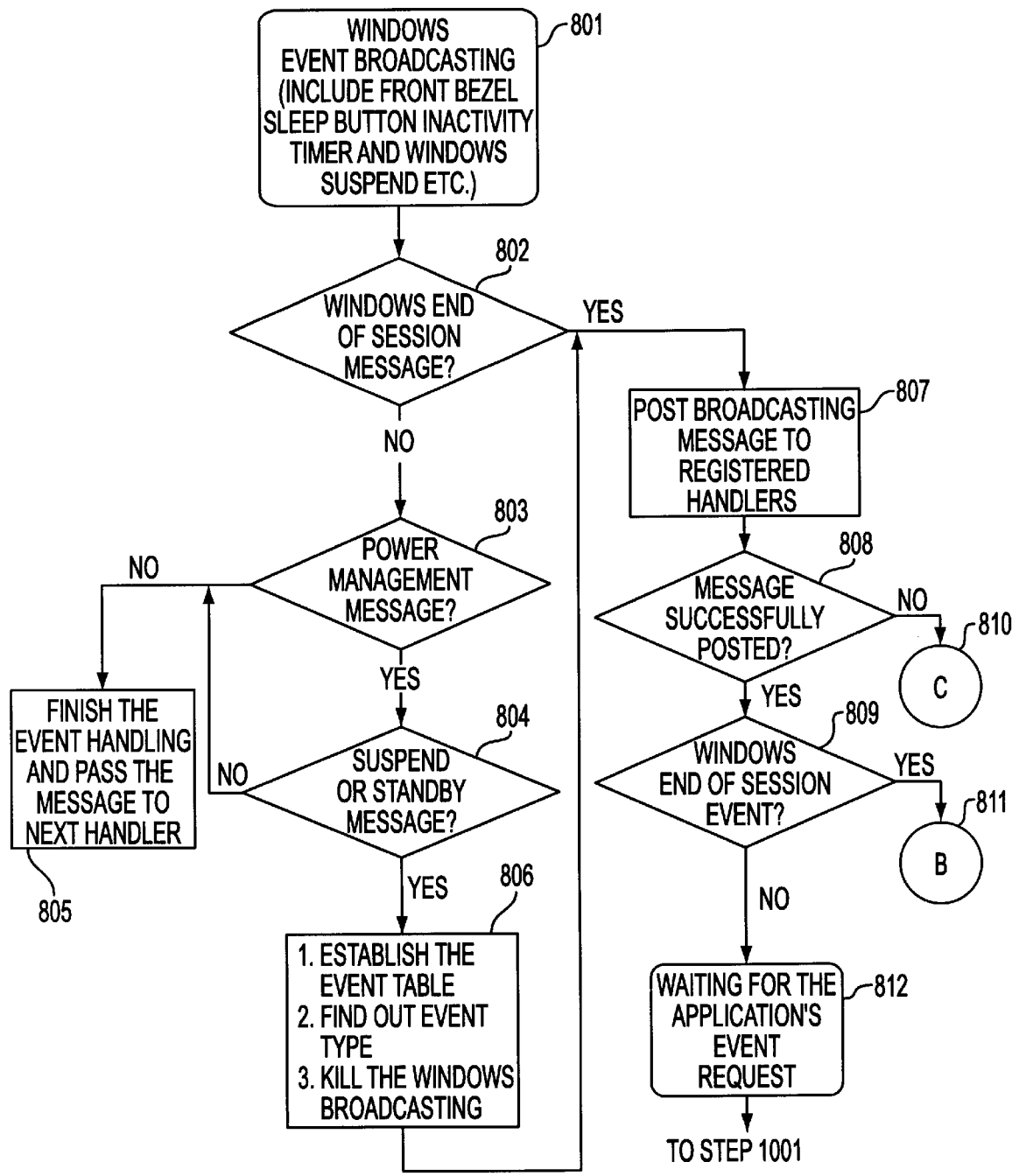
FIG. 8 shows how a Windows™ system broadcasting message can be handled.

FIG. 8 shows how the Windows95™ system broadcasting message can be handled. For example, if a SLEEP button is pressed, the BIOS posts the message to the operating system. Thereafter, the operating system broadcasts the message to everyone, including the new APM driver (step 801).

In step 802, a check is made to determine whether the message is a Windows "end of session" message. If so, then processing advances to step 807, wherein the message is broadcast to all registered handlers (any application which wants to know APM broadcasting messages must register to get the messages). In step 808, if the message is not successfully posted, then step 810 is executed (see FIG. 7, entry point C). If the message is successfully posted, then in step 809 a test is made to determine whether the event is an "end of session" event. If so, then step 811 is executed (see FIG. 7, entry point B); otherwise, processing advances to step 812. In step 812, waiting commences for the application's event request (e.g., if the application wants to turn off/on, or standby or suspend some devices).

Referring again to step 802, if the message is not an end of session message, then in step 803 a test is made to determine whether the message is a power management message. If not, then in step 805 the event handling is finished and the message is passed to the next event handler (VxD and application communication handler). If, however, the message is a power management message, then in step 804 a test is made to determine whether it is a suspend or standby message (suspend from Windows™, or standby from a SLEEP button). If not, then processing advances to step 805.

If, however, the message is a suspend or standby message, then processing advances to step 806. In step 806, the event table is established (i.e., must trace the event and establish the event state machine to manage the event). The event type is determined, and the Windows broadcasting is killed (some messages should not be delivered by Windows to the next applications). Thereafter, processing resumes at step 807 as described previously.

In principle, a new "OEM" message is generated from the BIOS to the operating system, and the operating system then gives the message to the new APM driver, which processes it to turn off various subsystems. After completion, a normal Windows "standby" message is posted, which is broadcast to everyone. This avoids the problem of Windows shutting down devices too early. For example, when an application attempts to access a disk, a "post message" function is posted to Windows, which causes a resume ("user resume"). Windows holds all application activity to turn on the hard disk drive. In other words, it makes Windows think that a resume occurred, even though none actually occurred.

Figure 9:
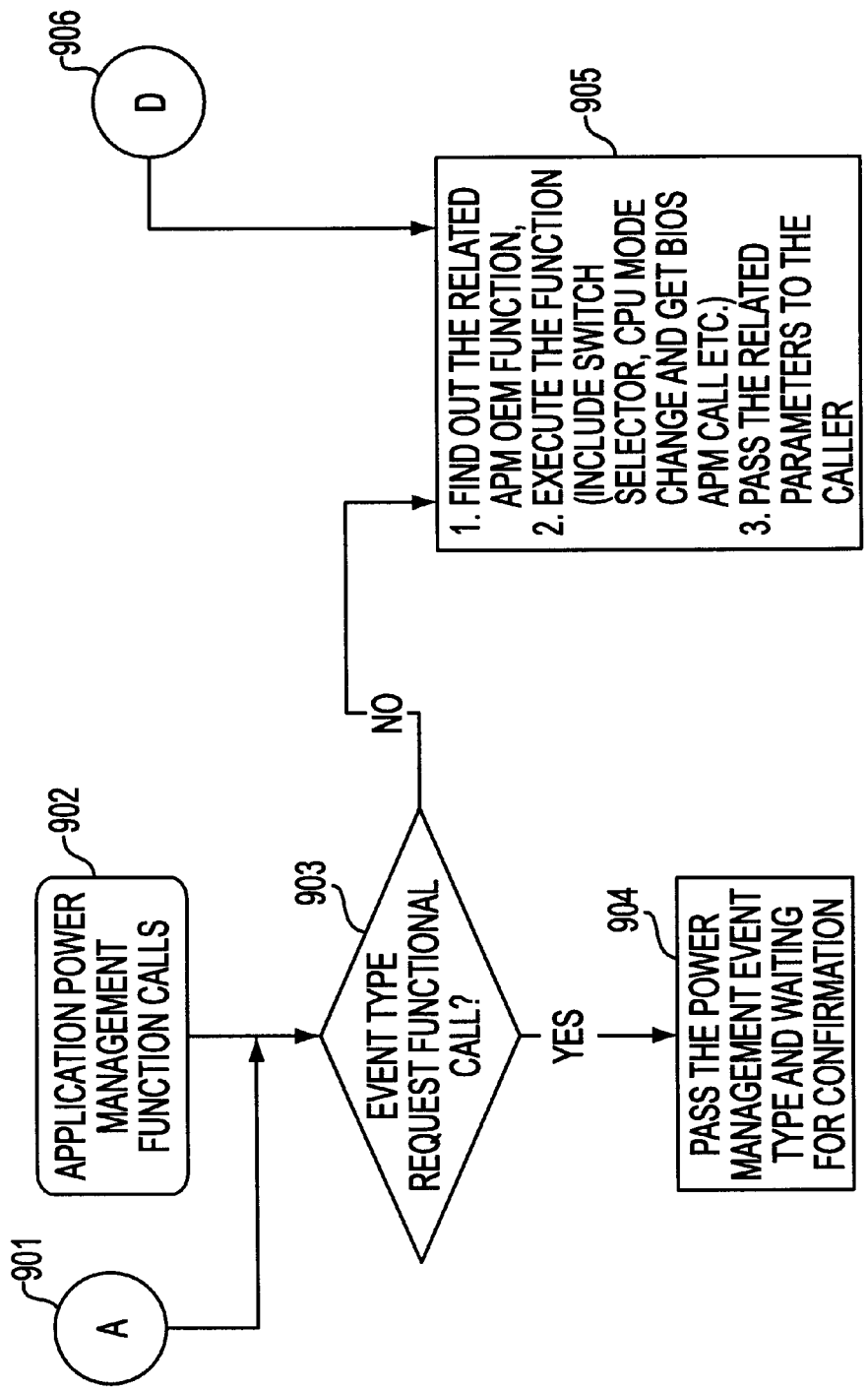
FIG. 9 shows one possible implementation of an APM function and event type passing.

FIG. 9 shows one possible implementation of an Advanced Power Management (APM) function and event type passing. When an application receives an event but does not know what kind of event, the type of event that occurred must be determined. Beginning in step 902, an application power management function is called. In step 903, a test is made to determine whether the event type request is a functional call (e.g., an application received an event but it needs to know what kind of event occurred). If the event type is a functional call, then in step 904 the power management event type is passed (VxD passes the event type and asks for confirmation that the application is ready to process the power management action).

If the event type is not a functional call, then processing advances to step 905. In step 905, the related APM OEM function is determined. The function is executed (including switch selector, CPU mode change and BIOS APM call). (In 32 bit mode, it is necessary to communicate with 16 bit BIOS code to establish the selector descriptor table). Finally, the related parameters are passed to the caller (VxD is the caller and the related parameter refers to the selector descriptor table parameters in 32 bit mode).

Figure 10:
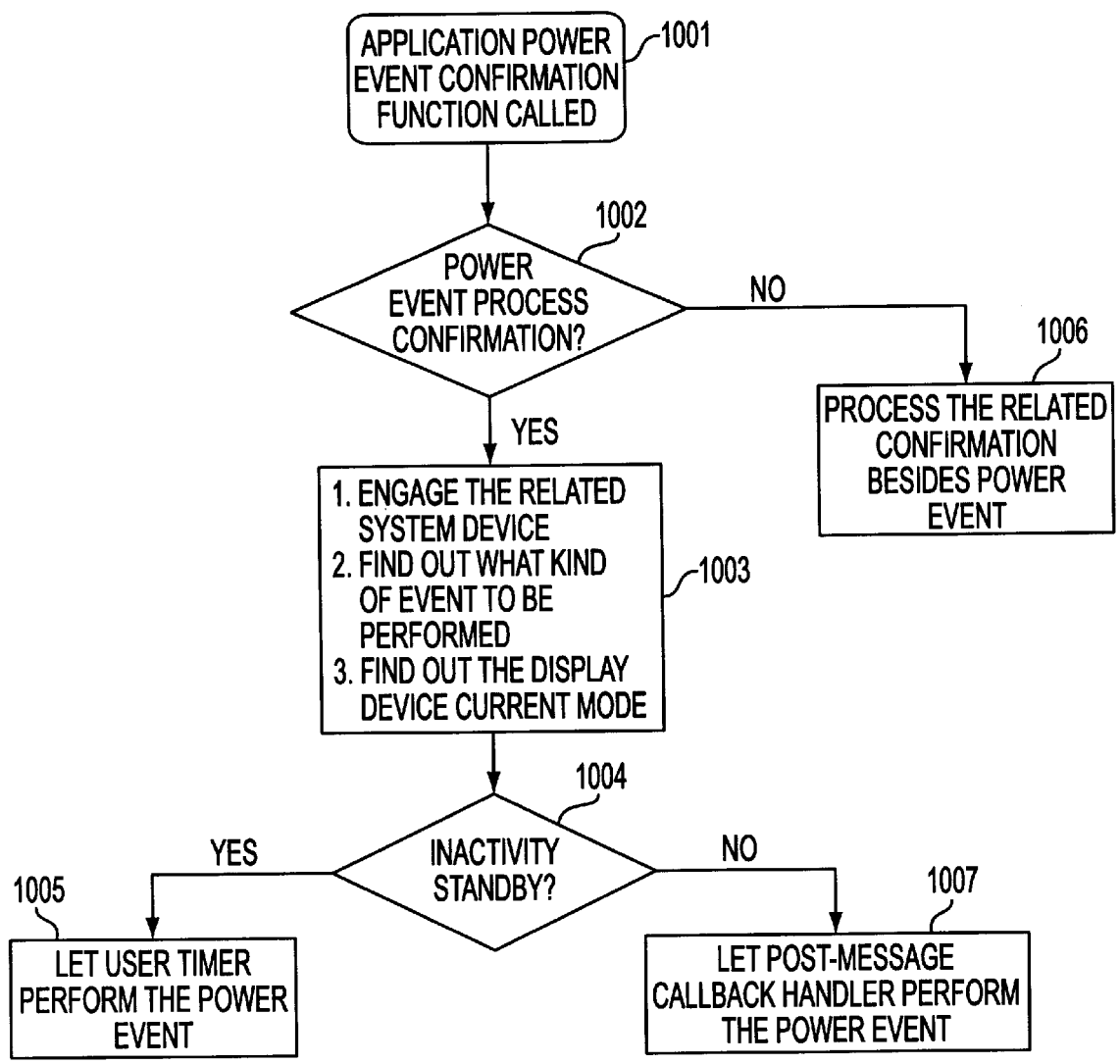
FIG. 10 shows how a host power event can be handled.

FIG. 10 shows how a host power event can be handled. In step 1001, an application power event confirmation function has been called. This makes sure the application is ready to process the power event. For example, to turn off the TV, before actually turning off the TV the system must make sure the TV application is unloaded. In step 1002, a test is made to determine whether it is a power event process confirmation. If not, then in step 1006 the related confirmation is processed.

In step 1003, the related system device is engaged. The kind of event to be performed is determined. Finally, the current mode of the display device is determined (traced in the event table). In step 1004, a test is made to determine whether inactivity standby occurred (pushbutton or user timer standby requests). If there is no activity standby, then in step 1007 the post-message callback handler performs the power event. If there is inactivity standby, then in step 1005 the user timer performs the power event. In other words, VxD posts the messages. Once the application receives this message, the system makes a call back to the VxD. The user timer is set up to process the event.

Figure 11:
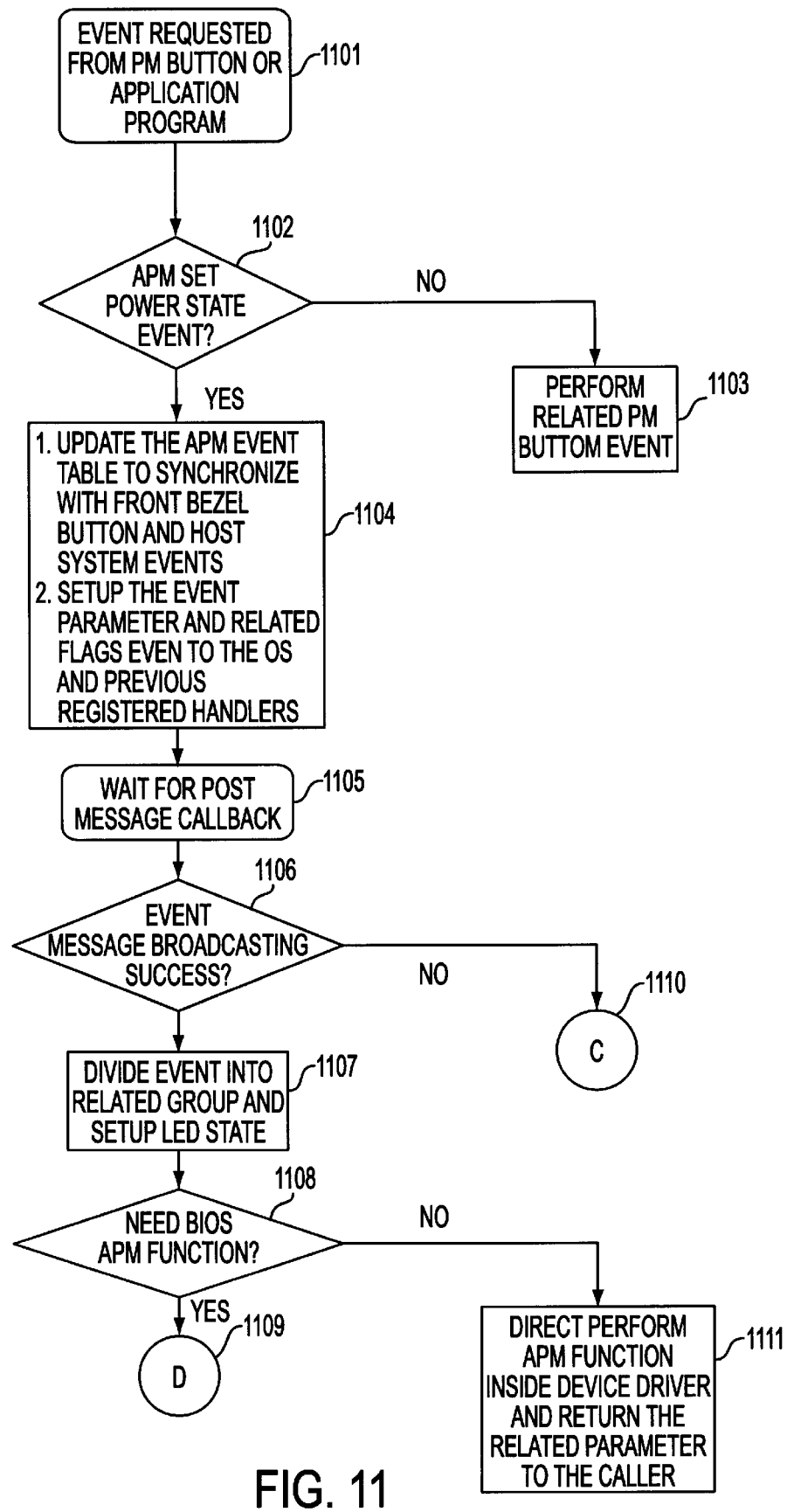
FIG. 11 shows how events generated by an application program and personality module can be handled.

FIG. 11 shows how events generated by an application program and personality module can be handled. Beginning in step 1101, an event is generated from either a personality module button (e.g., SLEEP or MODE), or an application program. In step 1102, a test is made to determine whether the event is an APM set power state event (i.e., see if the application wants to change the power mode).

If not, then in step 1103 a related PM button event is performed (i.e., if a mode event, process it accordingly). If the event is an APM power state event, then in step 1104 the APM event table is updated to synchronize with the front bezel button and host system events. This involves saving the state of the front bezel button (e.g., sleep "on"), and setting flags for the driver to pass events to the handler, which gives it to the application.

In step 1105, the process waits for a post message callback (i.e., waits for acknowledgment that the event has been received by the application). In step 1106, a test is made to determine whether the event message broadcast was successful. If not, then processing advances to step 1110 (entry point C in FIG. 7). Otherwise, in step 1107 the event is divided into related groups (e.g., suspend, standby, off) and the LED state is set up (i.e., power state indicator).

Next, in step 1108, a test is made to determine whether a BIOS APM function is needed. For example, some functions require BIOS support (e.g., hard disk drive), while others (TV) do not. If so, then processing advances to step 1109 (entry point D in FIG. 9). If not, then in step 1111 the subsystem power mode changes are performed in the VxD driver.

Figure 12:
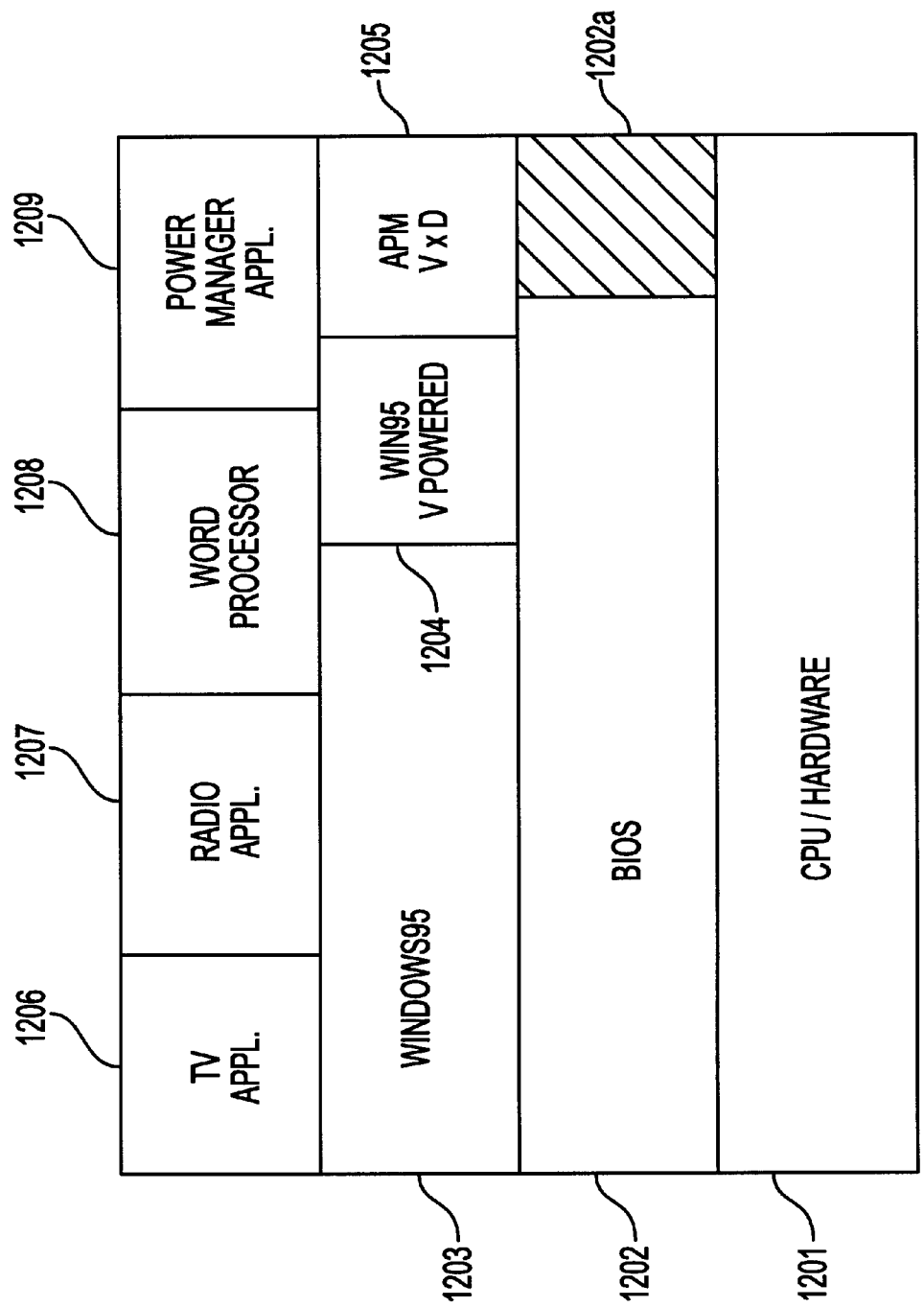
FIG. 12 shows one possible software configuration for a system employing various principles of the present invention.

Reference will now be made to FIG. 12, which shows one possible software configuration for a system employing the present invention. As is conventional, a computer system includes a CPU and other hardware elements 1201, and a Basic Input/Output System (BIOS) firmware or software component 1202. In accordance with the one embodiment of the present invention, additional functions can be provided at the BIOS level (1202a) to support certain power management features described above. One possible set of functions which can support these features is shown in FIGS. 13 through 18. As one example, the Intel Corporation's version of BIOS can be augmented to support the functions shown in FIGS. 13 through 18. Other vendors and BIOS versions could instead be used.

As shown in FIG. 12, an operating system such as the Windows95™ operating system typically makes calls to the BIOS. A WIN95 VPOWERD component 1204 and a new APM VxD driver 1205 according to the present invention can be used to handle certain power management events as described above. One goal is to keep the WIN95 VPOWERD device driver intact and maintain the normal system BIOS features, and put the majority of the APM customized functions (described above) in the APM VxD device driver. A personality module driver (not shown) can be used to interface to the personality module.

A power manager application 1209 can be used to install and initialize the APM VxD driver as described in FIG. 7. Other applications including a TV consumer device application 1206, FM radio consumer device application 1207, and word processor application 1208 execute in the Windows95™ environment as is conventional.

FIGS. 13 through 18 describe additional functions which can be added to a conventional BIOS to support power management features according to the present invention. These functions are exemplary only, and the invention can be practiced with an entirely different set of functions or approaches.

Thus has been described a system and method for implementing power saving features in a computer system comprising a plurality of subsystems and one or more consumer devices. It is apparent that many modifications and variations of the present invention are possible, and references to specific values are by example only. The use of the word "button" in the appended claims should be understood to refer to any of various types of switches including momentary pushbuttons, throw-type switches, capacitance-triggered switches, and the like. The method steps of the invention may be practiced in a different ordered sequence from that illustrated without departing from the scope of the invention. It is, therefore, to be understood that within the scope of the appended claims the invention may be practiced otherwise than as specifically described.

I claim:

1. A computer system having a power saving feature, comprising:
    a plurality of subsystems coupled together to provide a computer function, wherein each subsystem can be independently placed into a power saving mode with reduced power consumption;
    a consumer device which provides a consumer-oriented function separately from the computer function, wherein the consumer device is coupled to one or more of the plurality of subsystems and shares usage of one or more of the subsystems with the computer function;
    a power switch which removes power from all of the plurality of subsystems;
    a user-accessible sleep button which causes a sleep signal to be generated indicating that a sleep mode is to be activated; and
    a power management function which, in response to the sleep signal, determines whether the consumer device is active and, if the consumer device is active, places all of the plurality of subsystems except those necessary to operate the consumer device in a power saving mode and, if the consumer device is not active, additionally places additional subsystems which are normally necessary to operate the consumer device in a power saving mode.

2. The computer system of claim 1, wherein the plurality of subsystems comprises a video controller which receives information representing a video signal and which controls a video monitor in accordance with the video signal.

3. The computer system of claim 2, wherein the consumer device comprises a television receiver which receives a television program and generates a television display signal which is fed to the video controller for display on the video monitor, and wherein the power management function does not place the video controller in a power saving mode if the television receiver is active but places the video controller in the power saving mode if the television receiver is not active.

4. The computer system of claim 3, wherein the computer system automatically enlarges a display window corresponding to the television display signal in response to the sleep signal.

5. The computer system of claim 2, wherein the consumer device comprises a radio receiver which receives a radio signal and generates an audio output; and
    wherein the power management function places the video controller in a power saving mode in response to the sleep signal irrespective of whether the radio receiver is active or inactive.

6. The computer system of claim 1, wherein the sleep button is located on a control panel associated with a video monitor.

7. The computer system of claim 1, further comprising a second user-accessible sleep button which causes the sleep signal to be generated; and
    wherein the power management function is responsive to the sleep signal caused by the second user-accessible sleep button to selectively place one or more of the plurality of subsystems in a power saving mode.

8. The computer system of claim 7, further comprising a third user-accessible sleep button located on a remote control device which causes the sleep signal to be generated; and wherein the power management function is responsive to the sleep signal caused by the third user-accessible sleep button to selectively place one or more of the plurality of subsystems in the power saving mode.

9. The computer system of claim 1, wherein the power management function powers up all of the plurality of subsystems in response to detecting a second occurrence of the sleep signal.

10. The computer system of claim 1, wherein in response to a hardware interrupt, the power management function powers up only those subsystems which are needed to service the interrupt and thereafter returns those subsystems to a power saving mode.

11. The computer system of claim 1, wherein the plurality of subsystems which can be independently placed into the power saving mode comprises a video controller, a disk controller, a keyboard controller, a CPU clock, and a mouse output clock.

12. The computer system of claim 1, wherein the computer system comprises a plurality of consumer devices each of which provides a consumer-oriented function separately from the computer function; and wherein the plurality of consumer devices comprises a television receiver, a radio receiver, a CD player, and a telephone answering machine.

13. A method of implementing a power saving feature in a computer system, the computer system comprising a plurality of subsystems which collectively support a computer function, wherein each subsystem can be independently placed into a power saving mode to reduce power consumption; a consumer device which provides a consumer-oriented function separately from the computer function, wherein the consumer device is coupled to one or more of the plurality of subsystems and shares usage of one or more of the subsystems with the computer function; a power switch which removes power from all of the plurality of subsystems; and a user-accessible sleep button which causes a sleep signal to be generated indicating that a sleep mode is to be activated, the method comprising the steps of:

(1) detecting activation of the sleep signal from the user-accessible sleep button; and (2) in response to step (1), determining whether the consumer device is active and, if the consumer device is active, placing all of the plurality of subsystems except those necessary to operate the consumer device in the power saving mode and, if the consumer device is not active, additionally placing all remaining subsystems in the power saving mode.

14. The method of claim 13, wherein step (2) comprises the step of placing a video controller into a power saving mode if a television consumer device is not active and inhibiting the placement of the video controller into the power saving mode if the television consumer device is active.

15. The method of claim 14, further comprising the step of, responsive to a determination that the television consumer device is active, automatically enlarging a television display window on a corresponding video monitor to display a television signal.

16. The method of claim 14, wherein step (2) comprises the step of placing the video controller into the power saving mode irrespective of whether a radio receiver consumer device is active or inactive.

17. The method of claim 13, further comprising the step of reactivating all of the plurality of subsystems in response to detecting a second occurrence of the sleep signal.

18. The method of claim 13, further comprising the step of automatically placing some but not all of the plurality of subsystems into the power saving mode upon detecting prolonged inactivity of a keyboard.

19. A method for saving power in a computer system, comprising the steps of:

(1) detecting inactivity of one or more subsystems in the system over time;

(2) responsive to detecting inactivity of the one or more of the subsystems, determining whether any of a plurality of consumer devices which are controlled by the computer system is active;

(3) responsive to determining that one of the consumer devices is active, inhibiting power saving features for subsystems required to operate the active consumer device and implementing power saving features for subsystems not required to operate the active consumer device; and (4) responsive to determining that none of the consumer devices is active, implementing power saving features for subsystems normally required to operate one or more of the consumer devices.

20. The method of claim 19, further comprising the steps of:

(5) detecting that a sleep mode has been activated; and (6) responsive to step (5), disabling all subsystems except those required to operate an active consumer device.

21. The method of claim 20, wherein step (3) comprises the step of determining whether a television receiver which uses a computer display subsystem is active and, responsive thereto, inhibiting a power saving mode of the computer display subsystem.

22. The method of claim 21, further comprising the step of automatically enlarging a television display window in response to determining that the television receiver is active.

23. The method of claim 19, further comprising the step of, responsive to detecting a hardware interrupt, reactivating only those subsystems necessary to service a function corresponding to the interrupt and, when the function has been completed, placing any subsystems so reactivated back into the power saving mode.

24. The method of claim 19, further comprising the step of installing a software driver which directly places one of the plurality of subsystems into the power saving mode without resort to a basic input/output system (BIOS) advanced power management (APM) function and which indirectly places another of the plurality of subsystems into the power saving mode through the use of one or more BIOS APM functions.

25. The method of claim 19, wherein step (3) comprises the steps of generating a message from BIOS to the Windows operating system, transferring the message from the Windows operating system to a power management driver, and placing the one or more of the plurality of subsystems into the power saving mode from the power management driver.

26. A computer system comprising:

a plurality of subsystems which collectively support a computer function, wherein each subsystem can be independently placed into a power saving mode to reduce power consumption;

a consumer device which provides a consumer-oriented function separately from the computer function, wherein the consumer device is coupled to one or more of the plurality of subsystems and shares usage of one or more of the subsystems with the computer function;

a power switch which removes power from all of the plurality of subsystems; and a user-accessible sleep button which causes a sleep signal to be generated indicating that a sleep mode is to be activated, wherein the computer system operates in an OFF state, ON APM ENABLED state, a SLEEP(−) state, and a SLEEP(+) state, wherein the OFF state is characterized by a total lack of power to all of the plurality of subsystems;

wherein the ON APM ENABLED state is characterized by steps of initially providing full power to each of the plurality of subsystems and, upon detecting occurrence of either the sleep signal or inactivity from one or more of the plurality of subsystems, transitioning the system to the SLEEP(−) state;

wherein the SLEEP(−) state is characterized by steps of placing those of the plurality of the subsystems which are not required to support an active consumer device into a power saving mode and inhibiting the power saving mode for those subsystems required to support any such active consumer device, and further characterized by steps of transitioning the system into the SLEEP(+) mode upon detecting occurrence of a hardware interrupt; and wherein the SLEEP(+) state is characterized by steps of determining which of the plurality of subsystems are required to perform a function corresponding to the hardware interrupt and, in response thereto, reactivating only those subsystems required to perform the function and, upon completion of the function, returning the system to the SLEEP(−) state.

27. The computer system of claim 26, wherein the SLEEP (−) state is further characterized by the step of, in response to detecting occurrence of the sleep signal, transitioning the system to the ON APM ENABLED state.

28. The computer system of claim 26, wherein the SLEEP (−) state is further characterized by the step of enlarging the size of a television display window if a television consumer device is active.

* * * * *